April 11, 1950     L. D. GOLDSMITH     2,503,384
RODENT EXTERMINATOR
Filed Jan. 9, 1948

WITNESS:
Esther M. Stockton

INVENTOR.
Lawrence D. Goldsmith
BY
Clinton S. Janes
ATTORNEY

Patented Apr. 11, 1950

2,503,384

UNITED STATES PATENT OFFICE 2,503,384

RODENT EXTERMINATOR

Lawrence D. Goldsmith, Elmira Heights, N. Y.

Application January 9, 1948, Serial No. 1,283

6 Claims. (Cl. 43—99)

1

The present invention relates to a rodent exterminator and more particularly to a device for electrocuting small animal pests such as mice and rats.

Various electrical devices have heretofore been proposed for killing animal pests but these have not been fully satisfactory, among other reasons, because they have incorporated exposed metallic surfaces which were electrically charged so as to be dangerous to children or pets, or they did not provide for the removal of the body of the electrocuted animal from the charged electrodes to prevent charring, etc., and/or were inconvenient to install, bait and clean.

It is an object of the present invention to provide a novel rodent electrocuting device which is convenient and efficacious in operation, and simple and economical in construction.

It is another object to provide such a device in which there are no exposed electrically charged surfaces which might be hazardous to children or pets.

It is another object to provide such a device which is arranged to eject the body of the electrocuted rodent so as to make the device continuously effective without resetting.

It is another object to provide such a device which can be conveniently baited and cleaned.

It is another object to provide such a device which is small and easily portable, and may be plugged into a convenience socket and supported thereby, or may be energized by an extension cord.

Further objects and advantages will be apparent from the following description taken in connection with the accompanying drawing, in which.

Figure 1:
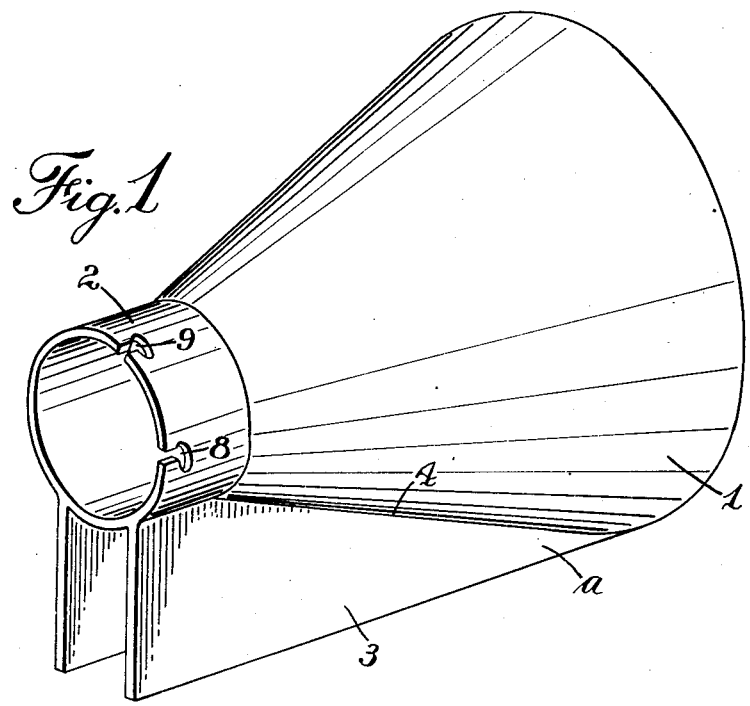
Fig. 1 is a perspective view of one preferred embodiment of the invention.
Figure 2:
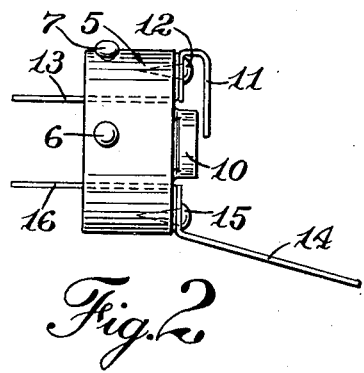
Fig. 2 is a side elevation of the closure member forming a bait holder and electrode carrier.
Figure 3:
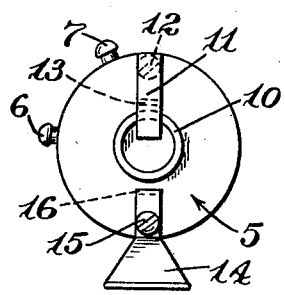
Fig. 3 is a front view of said closure member.

In Fig. 1 of the drawing there is illustrated a sleeve member 1 of suitable non-conducting material such as a molded plastic, here shown in the form of a frustum of a cone terminating in a cylindrical portion 2 of reduced diameter. Means for supporting the sleeve on its side is provided in the form of a pair of ribs or flanges 3 which are so tapered that the bottom 4 of the sleeve forms an inclined passage or ramp, the angle (a) of inclination being sufficient to cause the body of an electrocuted animal to slide or roll out of the sleeve.

2

A closure for the small end of the sleeve is provided in the form of a cylindrical plug 5 which is slidably fitted within the cylindrical portion 2 of the sleeve and is retained therein by suitable means such as pins 6, 7 which enter bayonet slots 8, 9 in the sleeve. The plug 5 is provided with a bait holder which may be in the form of a cylindrical rib 10 centrally located on the inner face thereof. An electrode 11 is arranged to extend partly over the bait holder and is fixed in any suitable manner, as by means of a screw 12, in the plug 2 in electrical contact with a conductor 13 projecting from the plug in position to make connection with a convenience socket or extension cord. A second electrode 14 is also fixed to the plug 2 as by means of a screw 15, in contact with a conductor 16 similar to the conductor 13. Electrode 14 is in the form of a strip or plate of conductive material extending down the inclined side or ramp 4 of the sleeve toward the open end of the sleeve. It will be noted that the pins 6, 7 are so located as to insure proper orientation of the plug to position the electrode 14 on the lower side or ramp portion 4 of the sleeve 1.

When it is desired to use this device, the plug 5 is withdrawn from the sleeve and a suitable bait material is pressed into the holder formed by the flange 9. The plug is then replaced in the sleeve 1, and inserted in a convenience socket or an extension cord connected to a source of electrical energy. It is contemplated that if the device is plugged into a convenience socket it will be supported thereby in proper position, and that when attached to an extension cord, it will rest on the flanges 3.

When a mouse or other rodent attracted by the bait enters the sleeve, its feet will come in contact with the electrode 14, and when it attempts to secure the bait, its nose will come into contact with electrode 11. Inasmuch as these portions of the rodent are relatively free from hair and are normally somewhat moist, a comparatively good electrical connection is thus formed which causes the rodent to be exterminated instantly with voltages in the order of the ordinary house lighting circuits or even the lower voltages sometimes used in small unit power plants.

As above stated, the inclination of the ramp 4 is such that the body of the electrocuted animal will roll or slide out of the sleeve, aided by the reflex action produced by the electrical shock, so that the instrument will remain ready for use at all times. In situations where infestation is heavy, it may be necessary to place the instrument on a small platform in order to insure free passage to the interior at all times.

It will be seen that there is here provided an effective instrument which is perfectly safe from hazard either of fire or shock, and is convenient to clean and service. Changes may be made in the form and dimensions of the parts illustrated without departing from the scope of the invention.

What is claimed is:

1. An electrically energized device for killing animal pests including a hollow sleeve of insulating material providing an inclined ramp, a closure for one end of the sleeve providing a bait holder adjacent the upper end of the ramp, an electrode mounted on the closure adjacent to the bait holder, a second electrode mounted on said closure and extending part way down the ramp, and means for connecting said electrodes to a source of electrical energy.

2. A device as set forth in claim 1 including further, means for supporting the sleeve with the ramp inclined upwardly sufficiently to cause the body of the animal when electrocuted to slide away from the closure.

3. A device as set forth in claim 1 including further, means for attaching the closure to the sleeve arranged to orient the closure so as to locate said second electrode on the ramp.

4. In an electrical mouse trap, a mounting and supporting means including a bait holder, an electrode mounted therein adjacent the bait holder, a second electrode in the form of a strip of conductive material located in said mounting means spaced from the first mentioned electrode and extending away from the bait holder, non-conducting means supporting and surrounding the bait holder and electrodes and including a ramp leading upwardly toward the bait holder, and supporting said second electrode; and means for connecting said electrodes to a source of electrical energy.

5. An electrocuting device for animal pests including a tapered sleeve of insulating material having a cylindrical portion, means for supporting said sleeve on its side so that its inner surface is sloped to eject an electrocuted animal, a plug in the cylindrical portion of the sleeve having a bait holder, an electrode within the sleeve adjacent the bait holder, and a second electrode within the sleeve extending down the lower side of the sleeve away from the bait holder; and means for connecting the electrodes to a source of electrical energy.

6. A device as set forth in claim 5 in which the electrodes are mounted on the plug and including further means for detachably mounting the plug in the sleeve in a predetermined angular position.

LAWRENCE D. GOLDSMITH.

REFERENCES CITED

The following references are of record in the file of this patent:

UNITED STATES PATENTS

| Number | Name | Date |
|---|---|---|
| 590,121 | Vaughan | Sept. 14, 1897 |
| 1,028,435 | Cessna | June 4, 1912 |
| 1,034,212 | Devich | July 30, 1912 |